United States Patent [19]
Hamby, Jr.

[11] Patent Number: 5,887,635
[45] Date of Patent: Mar. 30, 1999

[54] TREE DELIMBING DEVICE

[76] Inventor: Thomas E. Hamby, Jr., Rte. 1, P.O. Box 27 A, Purlear, N.C. 28655

[21] Appl. No.: 13,158

[22] Filed: Jan. 26, 1998

[51] Int. Cl.⁶ .............................. B27L 1/00; A01G 23/00
[52] U.S. Cl. ........................ 144/343; 144/24.13; 144/335
[58] Field of Search .................. 144/4.1, 24.13, 144/336, 337, 338, 343, 335

[56] References Cited

U.S. PATENT DOCUMENTS

| | | | |
|---|---|---|---|
| 4,369,824 | 1/1983 | Dressler et al. | 144/24.13 |
| 4,742,854 | 5/1988 | Forslund | 144/343 |
| 4,749,012 | 6/1988 | Hamby, Jr. | 144/24.13 |
| 4,899,794 | 2/1990 | Hamby, Jr. | 144/24.13 |
| 4,922,976 | 5/1990 | Hacker | 144/343 |
| 5,129,438 | 7/1992 | Hamilton | 144/343 |
| 5,515,895 | 5/1996 | Hamby, Jr. | 144/24.13 |
| 5,533,555 | 7/1996 | Hudson | 144/343 |

*Primary Examiner*—W. Donald Bray
*Attorney, Agent, or Firm*—Alston & Bird LLP

[57] ABSTRACT

A cutter head assembly for delimbing trees includes two pairs of opposing curved limb-stripping levers including curved cutting blades. The limb-stripping levers of each pair are pivotably movable toward and away from each other for engaging and encircling the trunk of a tree. One pair of levers is positioned and configured for engaging and removing limbs from opposite side and lower portions of a tree trunk being drawn longitudinally through the cutter head assembly. The other pair of levers is positioned and configured for engaging and removing limbs from opposite side and upper portions of a tree trunk. The limb-stripping levers include angled deflecting members attached to the cutting blades for deflecting cut pieces of a tree outwardly away from the cutting blades.

14 Claims, 3 Drawing Sheets

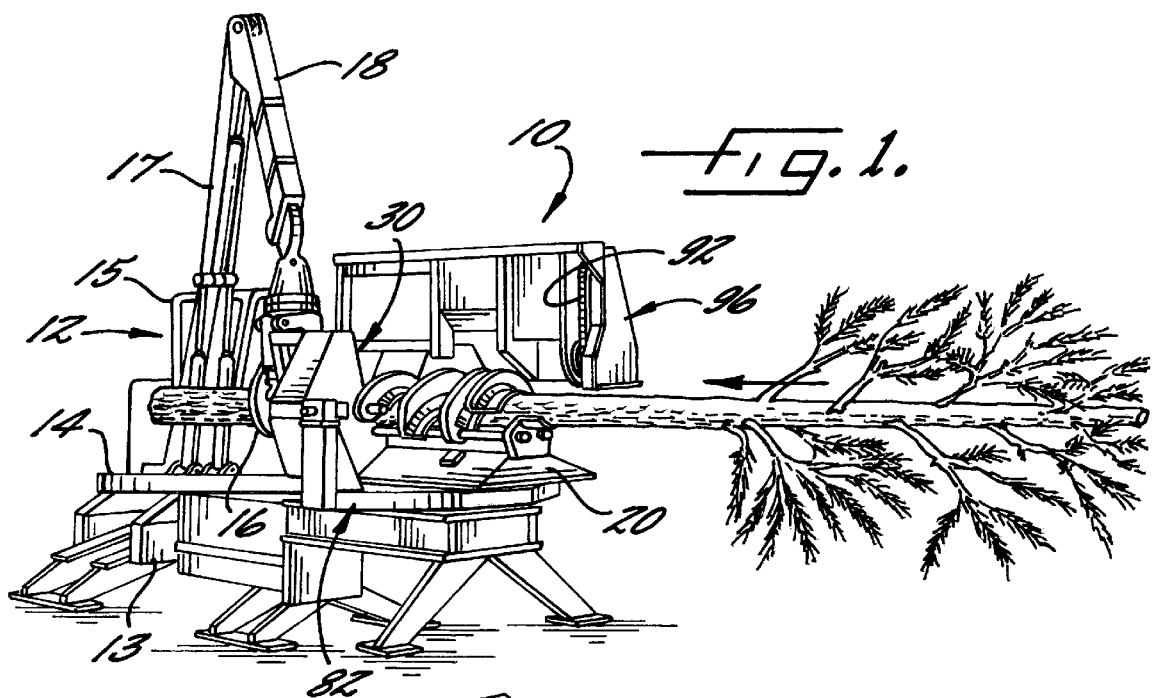
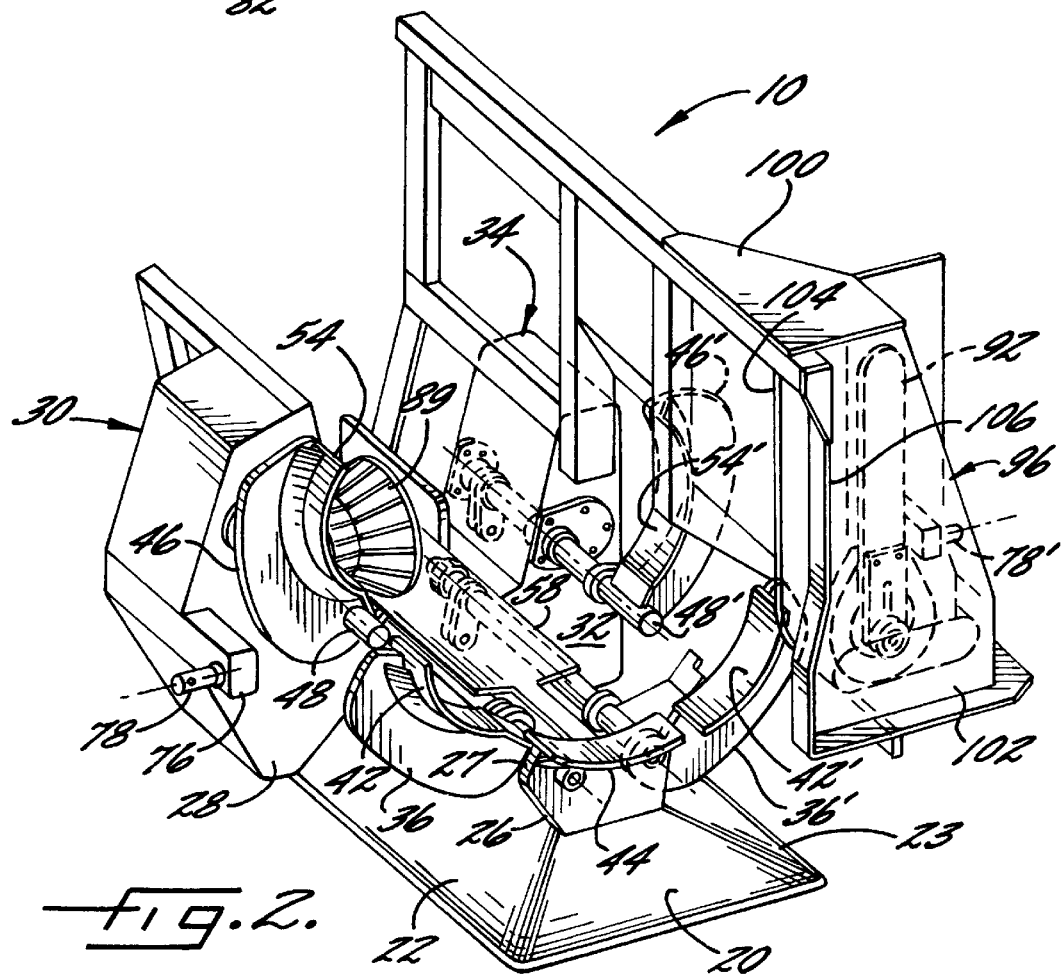

TREE DELIMBING DEVICE

FIELD OF THE INVENTION

The present invention relates to a device for delimbing felled trees and, more particularly, to a device having a cutter head assembly including two independently movable pairs of limb-stripping levers which are pivotable for engaging the bole of a tree being drawn longitudinally through the device.

BACKGROUND OF THE INVENTION

It is known to remove limbs from trees by encircling the tree trunk or bole with curved cutting blades and either moving the curved blades along the length of the tree, or pulling the tree longitudinally through the curved blades. My prior U.S. Pat. Nos. 4,749,012, 4,899,794, and 5,515,895, each of which is incorporated in its entirety herein by reference, describe self-aligning cutter head assemblies for delimbing trees in which curved cutting and limb stripping levers having cutting blades are carried by a rectangular support frame supported for pivotal movement in both vertical and horizontal planes so that the limb stripping blades are automatically maintained in proper alignment with respect to the longitudinal axis of the tree as the tree is drawn longitudinally through the cutter head assembly in a generally horizontal orientation. A pair of curved limb stripping levers having curved cutting blades are spaced about the longitudinal axis of the cutter head assembly and are pivotable toward and away from each other for engaging and disengaging a tree bole. The limb stripping levers and blades are positioned and configured to substantially encircle a tree bole disposed in the cutter head assembly, except for the bottom portion of the tree bole for which a stationary blade is provided for removing limbs therefrom.

The delimbing devices disclosed in the aforementioned patents are relatively inexpensive to manufacture and maintain, and are highly effective and efficient for removing limbs from trees having a bole diameter of up to about 14 inches. However, in certain applications, trees having bole diameters of up to about 24 inches must be delimbed. For these larger trees, the curved limb stripping levers and cutting blades are not capable of encircling the uppermost portions of the tree bole and, consequently, limbs on these uppermost portions are not removed by the cutter head assembly.

SUMMARY OF THE INVENTION

The present invention overcomes this drawback associated with my prior cutter head assemblies by providing a cutter head assembly having a generally rectangular support frame which supports two pairs of curved limb-stripping levers. Each of the limb-stripping levers includes a curved cutting blade fixed thereto, and the limb-stripping levers of each pair are disposed generally opposing one another and generally equally spaced about a longitudinal axis of the cutter head assembly. The limb-stripping levers of each pair are pivotally supported for movement toward and away from each other. The first pair of limb-stripping levers and cutting blades are configured and positioned to engage opposite side and lower portions of a tree bole of a predetermined maximum diameter being pulled through the cutter head assembly generally along the longitudinal axis. The second pair of limb-stripping levers and cutting blades are configured and positioned to engage opposite side and upper portions of a tree bole of the predetermined maximum diameter. Thus, the two pairs of cutting blades working together are capable of stripping limbs from tree boles having a wide range of diameters including trees having diameters exceeding the capabilities of prior cutter head assemblies employing a single pair of curved blades. Additionally, two or more smaller-diameter trees can be drawn through the cutter head assembly simultaneously. The cutter head assembly is also effective in delimbing multi-stem trees.

The limb-stripping levers of the first pair are pivotable about horizontally spaced first axes which are equally spaced about and parallel to the longitudinal axis of the cutter head assembly. The second pair of levers are pivotable about second axes which are equally spaced about and parallel to the longitudinal axis and are spaced horizontally outward of and vertically above the first axes. The second pair of levers is thus positioned for engaging upper portions of a tree bole, while the first pair is positioned for engaging lower portions of the tree bole.

The cutting blades extend generally longitudinally forward from the limb-stripping levers. Each lever preferably includes a deflecting member connected to the cutting blade and angled outwardly therefrom for deflecting cut pieces of a tree outwardly away from the cutting blade. The levers include transversely extending portions and the cutting blades are joined approximately perpendicularly to the transversely extending portions. The deflecting members preferably comprise bevel plates connected between the cutting blades and the transversely extending portions of the limb-stripping levers adjacent the junctures therebetween. The bevel plates advantageously are angled approximately 45°–60° with respect to the cutting blades for deflecting limbs and cut pieces outwardly away from the cutting blades and their junctures with the levers. The bevel plates permit the cutting blades to cut limbs having diameters exceeding the longitudinal extent of the blades, by turning the already-cut portion of a limb outwardly so that the cutting blade can engage the remaining uncut portion of the limb.

The cutter head assembly includes a saw box for removing the top portion of a tree which is too small in diameter to be effectively delimbed by the curved blades. The saw box is located generally adjacent a front end of the rectangular support frame, and includes a housing which partially encloses a saw, the saw being pivotable for engaging a tree disposed in the cutter head assembly. The forward edge of the housing supports a cutting blade positioned to remove limbs which would otherwise press against and interfere with the saw box. More particularly, the saw box housing advantageously includes a vertically oriented guard member located forward of the forwardmost pair of curved limb-stripping levers, and the cutting blade is affixed at an inner edge of the guard member.

The second pair of levers is spaced downstream of the first pair of levers. The first pair of levers are geared together so that they open and close synchronously. The second pair of levers are movable independently of each other so that each of the second levers remains engaged with the tree trunk even when the tree trunk is crooked, and so that a crooked tree can pass through the cutter head assembly.

The cutter head assembly includes a mounting arrangement that permits the cutter head assembly to pivot about vertical and transverse horizontal axes so that it is self-aligning with a tree trunk being drawn through it. The closing of the levers about a tree preferably is sequenced such that the first pair of levers close first to engage the tree and align the cutter head assembly with the longitudinal axis of the tree, and the second pair of levers then close.

BRIEF DESCRIPTION OF THE DRAWINGS

Other objects and advantages will become apparent from the following description taken in conjunction with the accompanying drawings in which:

FIG. 1 is a perspective view of the cutter head assembly supported on one end of a knuckle boom loader and showing a tree trunk being pulled through the cutter head assembly by the grapple of the knuckle boom loader;

FIG. 2 is a perspective view of the cutter head assembly in isolation, showing the curved limb-stripping levers in open positions in preparation for receiving the bole of a tree;

DETAILED DESCRIPTION OF THE DRAWINGS

Figure 4:
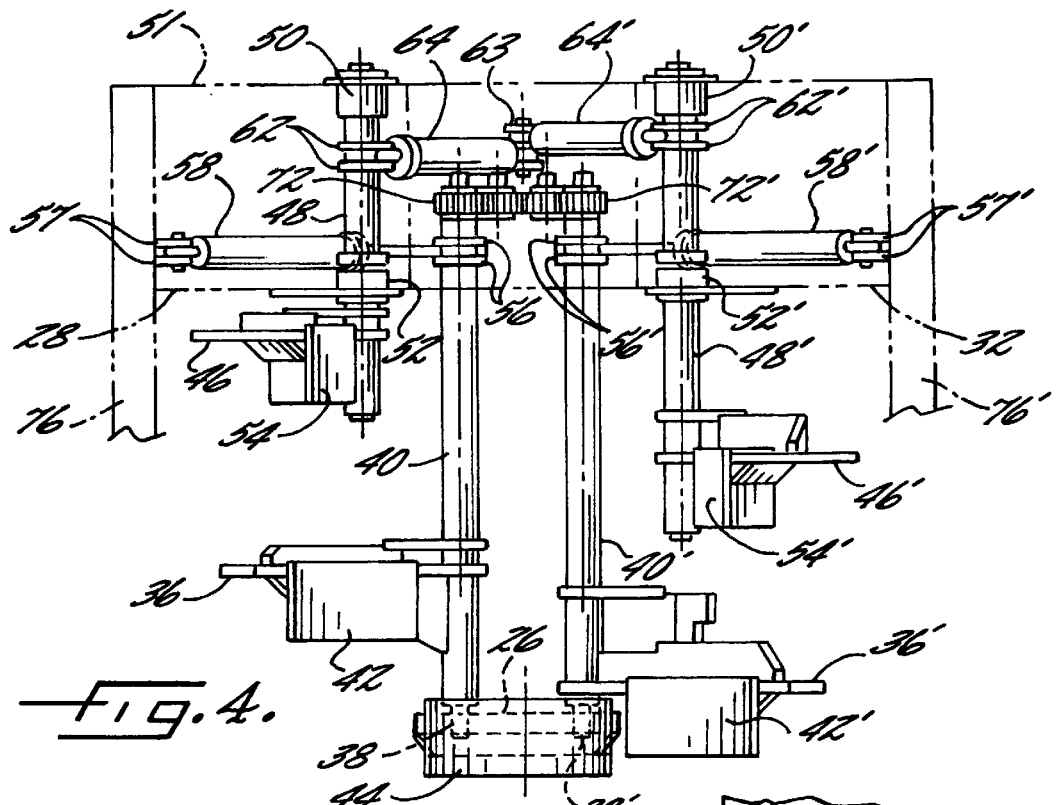
FIG. 4 is a fragmentary top elevational view of the cutter head assembly, showing the mounting of the limb-stripping levers on rotational drive tubes and support shafts.

With reference to FIG. 1, a cutter head assembly 10 is supported on an extension of a knuckle boom loader 12. The knuckle boom loader 12 may be of any suitable type and includes a lower frame 13 supporting a pivotal platform 14 on which is mounted a suitable operator enclosure 15 and a boom having crane arms 17, 18 supporting a grapple 16 on the free end thereof. The crane arms 17, 18 and the grapple 16 are operated in conventional manner by means of hydraulic cylinders (not shown).

The knuckle boom loader 12 is typically used for picking up felled trees which have already been delimbed either to cut them into shorter lengths and place them on a truck for transportation or to place them on a truck in their full lengths without cutting them into shorter lengths. The trees are normally skidded or dragged from the forest and stacked adjacent the knuckle boom loader 12, after having had the limbs cut therefrom in the woods by a hand chain saw operation. However, by providing the cutter head assembly 10 on the knuckle boom loader 12, this time-consuming hand chain saw operation is avoided. Instead, the felled trees can be stacked next to the knuckle boom loader 12 before having their limbs removed, and the knuckle boom loader operator can carry out the delimbing operation in an efficient and economical manner by simply drawing a tree through the cutter head assembly 10 after the tree is lifted from a stack of felled trees to be loaded onto the truck. The delimbed tree can then either be cut into shorter lengths and loaded onto the truck, or loaded onto the truck without further cutting.

With reference to FIGS. 2–6, the cutter head assembly 10 is of the same type as described in my earlier U.S. Pat. Nos. 4,749,012, 4,899,794, and 5,515,895, and includes a rectangular support frame having a rearwardly inclined front end wall 20, opposite inwardly inclined side walls 22 and 23, and a top plate 24. A front bearing plate 26 is affixed to the support frame and extends vertically upwardly therefrom adjacent the juncture between the front end wall 20 and the top plate 24. A left rear bearing plate 28 is affixed to the support frame and extends vertically upwardly therefrom adjacent a rear edge of the left side wall 22, the left rear bearing plate 28 forming a front wall of a left-side enclosure 30 for housing a pair of actuators, as further described below. A right rear bearing plate 32 is affixed to the support frame and extends vertically upwardly therefrom adjacent a rear edge of the right side wall 23, the right rear bearing plate 32 forming a front wall of a right-side enclosure 34 for housing a second pair of actuators, as further described below.

A first pair of curved cutting and limb-stripping levers 36, 36' is supported adjacent the front end wall 20 by a pair of horizontal longitudinally extending support shafts 38, 38' which are parallel to a longitudinal axis of the cutter head assembly defining a feed direction for a tree through the cutter head assembly. Left support shaft 38 has a front end supported in a bearing in front bearing plate 26 and a rear end supported in a bearing in left rear bearing plate 28. Right support shaft 38' has a front end supported in a bearing in front bearing plate 26 and a rear end supported in a bearing in right rear bearing plate 32. Sleeved over the support shafts 38, 38' are left and right rotatable support tubes 40 and 40', respectively, which are rotatable about the respective support shafts 38, 38'. The curved limb-stripping levers 36, 36' are secured to the rotatable support tubes 40, 40', respectively, for rotation therewith. Thus, rotation of the support tubes 40, 40' in one direction or the other causes the limb-stripping levers 36, 36' to be rotated toward or away from each other, as can be seen by comparing FIG. 4 which shows the levers in open positions in preparation for receiving a tree bole, with FIGS. 5 and 6 which show the levers in various closed positions engaging tree boles of various diameters.

Figure 6:
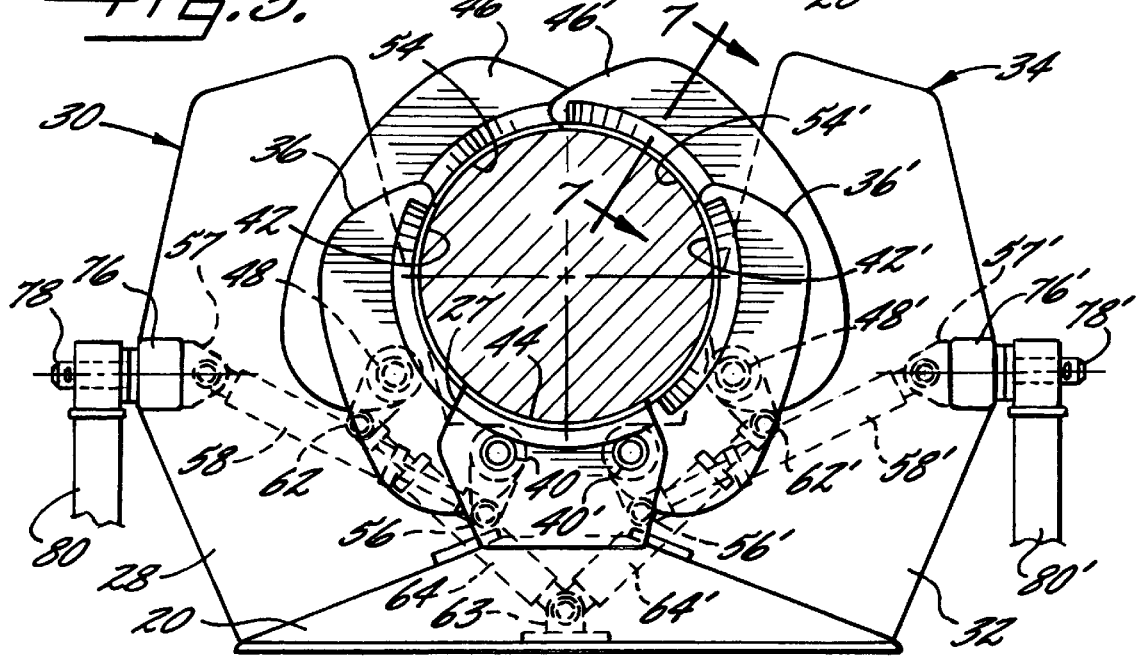
FIG. 6 is a front elevational view similar to FIG. 5, showing the limb-stripping levers engaging a tree bole of a predetermined maximum diameter, the first (forward) pair of levers engaging opposite side and lower portions of the tree bole and the second (rearward) pair of levers engaging opposite side and upper portions of the tree bole.

The limb-stripping levers 36, 36' have respective curved cutting blades 42, 42' fixed to their inner curved surfaces and extending generally longitudinally forward thereof, and collectively define a tree-encircling cutting opening therebetween for longitudinal movement of a tree trunk in one direction through the cutting opening, as illustrated in FIG. 1. The limb-stripping levers 36, 36' and cutting blades 42, 42' are positioned and configured to encircle opposite side and lower portions of a tree bole of a predetermined maximum diameter. Advantageously, the limb-stripping levers 36, 36' and cutting blades 42, 42' are positioned and configured for removing limbs from opposite side and lower portions of a tree bole having a diameter of up to about 24 inches, as illustrated in FIG. 6 which depicts a tree bole of the predetermined maximum diameter disposed within the cutter head assembly. Additionally, a stationary lower cutting blade 44 is affixed to the front bearing plate 26 for engaging a bottom portion of the tree for removing limbs therefrom which would otherwise not be removed by the limb-stripping levers 36, 36'.

The cutter head assembly 10 includes a second pair of curved limb-stripping levers 46 and 46' supported downstream of the first pair of limb-stripping levers 36, 36'. The second limb-stripping levers 46, 46' are mounted on rotatable support tubes 48, 48', respectively, each of which is supported by a pair of bearings. Left support tube 48 is supported at its rear end by a bearing 50 secured to a rear wall (not shown, but indicated by phantom line 51 in FIG. 4) of the left-side enclosure 30, and is supported partway along its length by a bearing 52 secured to the left rear bearing plate 28. The support tube 48 extends forwardly from the left rear bearing plate 28, and limb-stripping lever 46 is attached to this forwardly extending portion of support tube 48.

Similarly, right support tube 48' is supported at its rear end by a bearing 50' secured to a rear wall (not shown, but indicated by phantom line 51 in FIG. 4) of the right-side enclosure 34, and is supported partway along its length by a bearing 52' secured to the right rear bearing plate 32. The support tube 48' extends forwardly from the right rear bearing plate 32, and limb-stripping lever 46' is attached to this forwardly extending portion of support tube 48'.

The second limb-stripping levers 46, 46' have respective curved cutting blades 54, 54' fixed to their inner curved surfaces and extending generally longitudinally forward thereof. The limb-stripping levers 46, 46' and cutting blades 54, 54' are positioned and configured to engage opposite side and upper portions of a tree bole of the predetermined maximum diameter, preferably about 24 inches as previously noted, as illustrated in FIG. 6. To this end, the support tubes 48, 48' are spaced horizontally outward of and vertically above the support tubes 40, 40' of the first pair of limb-stripping levers 36, 36'. The second pair of limb-stripping levers 46, 46', further define, together with the first pair of limb-stripping levers 36, 36', a tree-encircling opening for longitudinal movement of a tree trunk through the cutter head assembly 10, as illustrated in FIG. 1.

Figure 3:
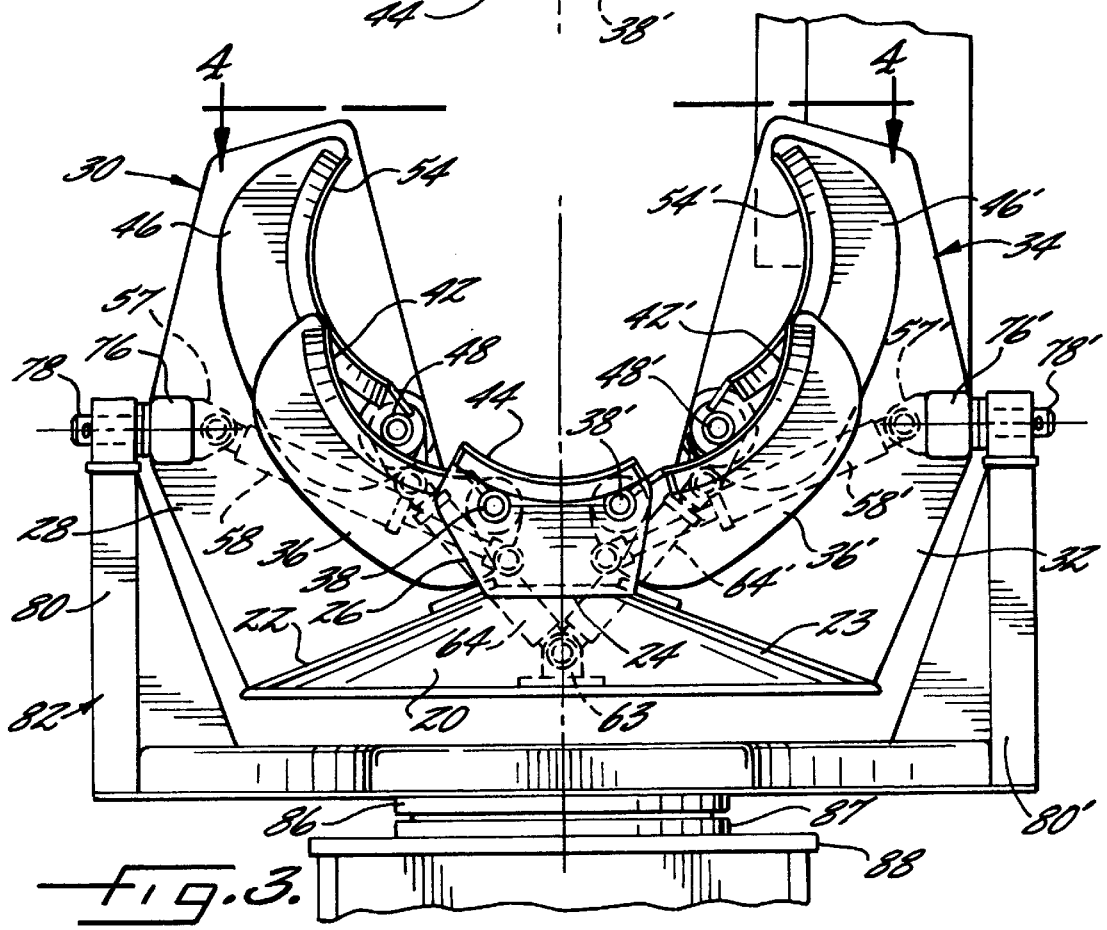
FIG. 3 is a front elevational view of the cutter head assembly with the limb-stripping levers in the open positions.

The limb-stripping levers 36, 36' and 46, 46' are opened and closed by a plurality of hydraulic cylinders. With reference to FIGS. 3, 4, and 6, support tubes 40, 40' each includes a pair of longitudinally spaced-apart depending crank arms 56, 56', respectively, located between the left and right enclosures 30 and 34 and beneath a cover plate 58 which extends longitudinally through the cutter head assembly 10 and shields the support tubes 40, 40' from being contacted by the tree trunk as it is pulled through the cutter head assembly. The lower ends of the crank arms 56 are pivotally attached to the rod ends of a pair of hydraulic cylinders 58, 58'. The cylinder ends of hydraulic cylinders 58, 58' are pivotally attached via brackets 57, 57' to a pair of support brackets 76, 76' which provide attachment points for supporting the cutter head assembly, as further described below. Retraction of the piston rods of hydraulic cylinders 58, 58' causes the levers 36, 36' to close toward each other and engage a tree positioned in the cutter head assembly. The hydraulic cylinders 58, 58' are each configured with two chambers separated from each other by a piston or ram attached to the piston rod. The chamber adjacent the rod end is coupled via a supply line (not shown) to a suitable supply of pressurized hydraulic fluid, and the chamber adjacent the cylinder end is coupled via a return line to an accumulator (not shown) having a compressible gas spring. Opening a supply valve (not shown), which may be located at the knuckle boom loader 12 for operation by the knuckle boom loader operator, causes hydraulic fluid to be supplied to the rod-end chambers of the hydraulic cylinders 58, 58' so that the piston rods are retracted, thus causing the first pair of levers 36, 36' to be closed. Hydraulic fluid in the cylinder-end chambers of the hydraulic cylinders 58, 58' is forced by the retracting pistons into the accumulator, causing the gas spring to be compressed. Thus, upon closing of the supply valve, the pressure is relieved in the rod-end chambers, and the gas spring expands and causes fluid to be pumped into the cylinder-end chambers to re-extend the piston rods and thereby open the levers 36, 36'.

The cutter head assembly 10 includes means for insuring that the limb-stripping levers 36 and 36' open and close in synchronism with each other. Specifically, the rotatable support tubes 40, 40' have respective timing gears 72, 72' coaxially attached adjacent their downstream ends for rotation therewith. A pair of idler spur gears 74, 74' are connected between the timing gears 72 and 72', the timing gear 72, idler spur gear 74, idler spur gear 74', and timing gear 72' thus forming a gear train which prevents non-uniform inward and outward movement of the limb-stripping levers 36, 36'.

The second pair of levers 46, 46' are opened and closed by a second pair of hydraulic cylinders 64, 64'. The cylinder ends of the hydraulic cylinders 64, 64' are pivotally attached to a common bracket 63 attached to the support frame at the longitudinal centerline of the cutter head assembly and extend upwardly and outwardly therefrom. The rotatable support tubes 48, 48' which support the second pair of levers have depending crank arms 62, 62'. The rod ends of the hydraulic cylinders 64, 64' are pivotally attached to the crank arms 62, 62'. The hydraulic cylinders 64, 64' are coupled to the pressurized fluid supply and the accumulator in opposite fashion from the hydraulic cylinders 56, 56', such that operating the supply valve to supply additional hydraulic fluid to the hydraulic cylinders 64, 64' causes the piston rods to extend rather than retract. Extension of the piston rods of hydraulic cylinders 64, 64' causes the second pair of levers 46, 46' to close. The levers 46, 46' are opened when the supply valve is operated to shut off hydraulic pressure to the cylinders 64, 64', via action of the accumulator as previously described.

A flow control valve (not shown) controls the opening and closing speed of the second levers 46, 46'. Preferably, the second levers 46, 46' are closed after the first levers 36, 36' have closed, and are opened after the first levers 36, 36' have opened. By closing first, the first levers 36, 36' align the cutter head assembly so that its longitudinal axis is along the longitudinal axis of the tree, as further described below.

The cutter head assembly 10 includes features permitting the cutter head assembly to pivot in both the vertical and horizontal planes so that it is self-aligning with the tree bole's longitudinal axis. The features permitting vertical and horizontal pivoting are substantially as disclosed in my prior U.S. Pat. No. 4,899,794, the entire disclosure of which is incorporated herein by reference. Thus, the left enclosure 30 includes a bracket 76 which supports an outwardly extending horizontal pivot pin 78, and likewise the right enclosure 34 includes a bracket 76' with an outwardly extending horizontal pivot pin 78'. The pivot pins 78, 78' are supported in the upper ends of upstanding vertical legs 80, 80', of a support yoke 82 which includes a horizontal medial portion in the form of a plate 84 extending horizontally beneath the rectangular support frame of the cutter head assembly. Thus, the rectangular support frame is cradled for swinging or pivotal movement in the vertical plane between the opposite vertical legs 80, 80' of the support yoke 82. It is preferred that the pivot pins 78, 78' be located slightly rearward of the center of gravity of the cutter head assembly 10 so that the rectangular support frame tilts down at the front end when the cutter head assembly is not in use.

The horizontal plate 84 is attached to an upper plate 86 of a slew or swivel ring, and the upper plate 86 is supported in the usual manner by ball bearings on a lower plate 87 of the slew or swivel ring. The lower plate 87 is fixed on a base support plate 88 which, in turn, may be fixed on an extension of a knuckle boom loader such as shown in FIG. 1, or which, alternatively, may be fixed on a trailer or other transportable vehicle to permit the cutter head assembly 10 to be readily moved from one site to another. Thus, the plates 86, 87 of the slew or swivel ring provide a pivotal connection for movement of the rectangular support frame in a horizontal plane.

In operation of the cutter head assembly, the operator of the knuckle boom loader 12 picks up a tree to be delimbed via the grapple 16, which engages the butt end portion of the tree bole. The fluid supply valve is in the closed position so that the hydraulic cylinders 58, 581 and 64, 641 position the limb-stripping levers in the open positions as shown in FIG. 3. The tree is lifted to a position above the level of the cutter head assembly 10 and the butt end is then lowered into position in engagement with the curved stationary cutting blade 44 and between the open limb-stripping levers 36, 36' and 46, 46', as illustrated in cross-section in FIG. 6.

When the butt end portion of the tree bole is positioned in the cutter head assembly 10, the cutter head assembly will pivot in both the vertical and horizontal planes so as to automatically become aligned with the longitudinal axis of the tree. The operator then operates the supply valve to supply hydraulic fluid to the hydraulic cylinders 58, 58' and 64, 64' so that the first levers 36, 36' rotate inwardly in a uniform synchronous manner on opposite sides of the tree trunk to encircle and resiliently engage the outer surface of the trunk. Any slight misalignment of the cutter head assembly with the trunk is corrected by engagement of the first levers 36, 36' with the trunk. Further in this regard, the front bearing plate 26 has an inwardly inclined edge surface 27 (FIG. 6) extending upwardly toward the fixed lower cutting blade 44 so that should the trunk be brought into engagement with the inclined edge surface 27, the closing of the first lever 36 will cause the trunk to ride up the inclined surface 27 and onto the bottom blade 44, thus preventing the trunk from becoming lodged between the first lever 36 and the front bearing plate 26. The second levers 46, 46' then close about the trunk. The knuckle boom loader operator then draws the tree through the cutter head assembly 10 by moving the grapple 16 away from the cutter head assembly. As the tree trunk moves through the cutter head assembly, the curved blades 42, 42', 54, 54', and 44 engage and strip any outwardly extending limbs from the tree trunk, and the cutter head assembly pivots on its mount to stay aligned with the tree trunk. A ridged or webbed hourglass-shaped roller 89 mounted for rotation about its longitudinal axis is located downstream of levers 46, 46' and helps to maintain the tree trunk centered in the cutter head assembly 10 as the trunk rides over the roller 89.

Figure 7:
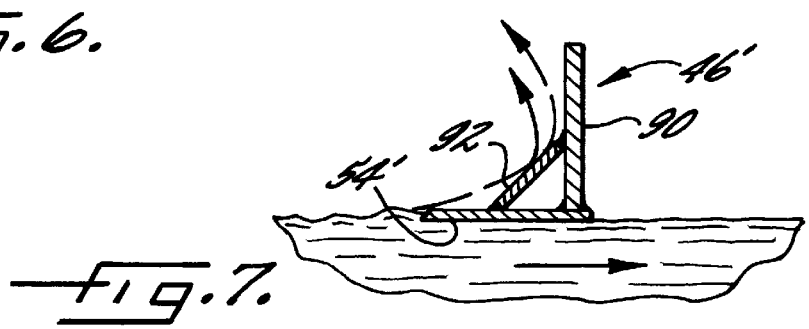
FIG. 7 is a cross-sectional view taken on line 7—7 of FIG. 6, illustrating one of the bevel plates for deflecting cut pieces outwardly and away from the cutting blade.

The limb-stripping levers 36, 36' and 46, 46' include angled deflecting members for deflecting cut pieces of the tree outwardly away from the cutting blades 42, 42' and 54, 54'. Specifically, with reference to FIG. 7 depicting a cross-section through the limb-stripping lever 46' which is representative of the construction of all of the limb-stripping levers, each limb-stripping lever includes a transversely extending portion 90 to which the curved cutting blade, for example 54', is attached at a curved inner edge of the transversely extending portion 90. The cutting blade 54' extends generally longitudinally forward of the transversely extending portion 90, such that an angle of approximately 90° is formed at the juncture therebetween. The limb-stripping lever 46' includes an angled deflecting member in the form of a bevel plate 92 which is connected between the transversely extending portion 90 and the cutting blade 54', the bevel plate in any generally radial plane such as the one indicated by line 7—7 of FIG. 6 forming an angle of about 45° to about 60° relative to the cutting blade 54'. As indicated by arrows 94 in FIG. 7, the bevel plate 92 deflects cut pieces of the tree outwardly away from the cutting blade 54', and particularly prevents cut pieces from becoming jammed in the corner of the juncture between the blade and the transversely extending portion of the limb-stripping lever.

Figure 5:
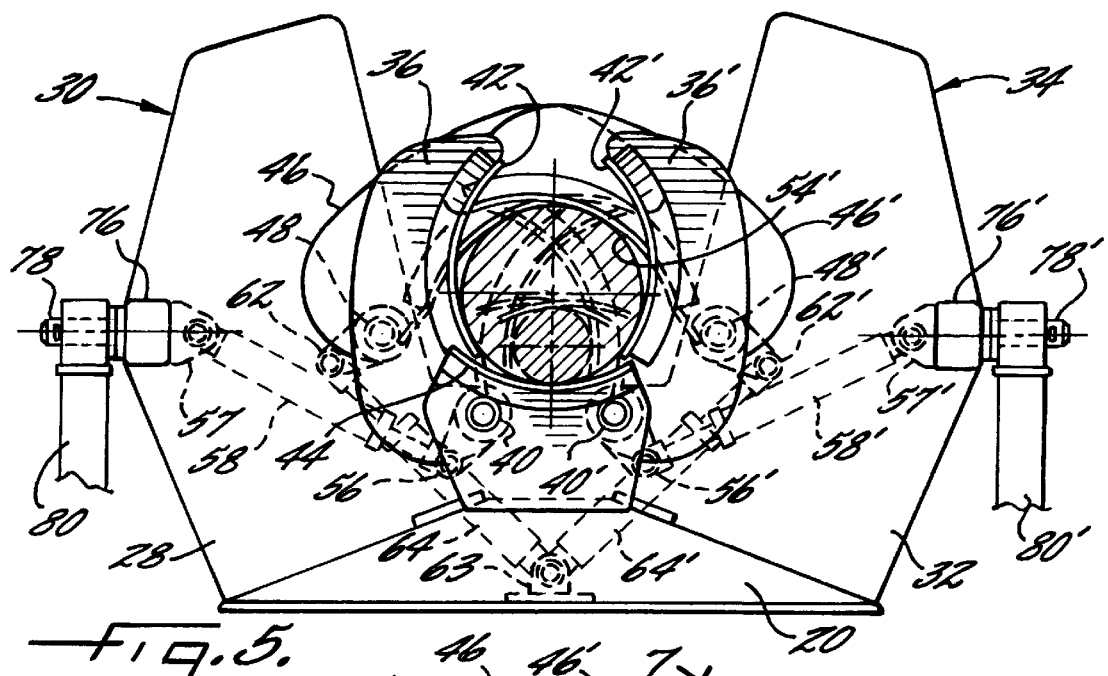
FIG. 5 is front elevational view of the cutter head assembly showing the limb-stripping levers engaging a tree bole of a first larger diameter disposed in the assembly, and showing in phantom lines the limb-stripping levers engaging a tree bole of a second smaller diameter.

As illustrated in dashed lines in FIG. 5, the limb-stripping levers 36, 36' and 46, 46' are initially moved in and resiliently held in encircling relationship with the full-size tree trunk adjacent its butt end. As the tree trunk is drawn through the cutter head assembly 10 and the limbs are stripped therefrom from the butt end to the top end, the diameter of the trunk gradually diminishes and the curved cutting and limb-stripping levers are moved inwardly and resiliently maintained in engagement with the trunk by continuous application of hydraulic pressure to the hydraulic cylinders until the tree trunk is reduced to a diameter of about 3–4 inches, as illustrated by the small dashed line circle of FIG. 5. If the trunk is crooked, the second levers 46, 46' move independently of each other to remain engaged with the trunk and to permit the trunk to pass through the cutter head assembly.

The cutter head assembly 10 includes a saw box 96 which houses a pivotally movable saw 98 for engaging the small-diameter top portion of the trunk to remove the top portion of the tree. The saw box 96 includes a housing 100 having a vertical front guard plate 102 and a vertical rear guard plate 104 spaced from and parallel thereto. The saw 98 is supported between the front and rear guard plates 102, 104 so as to be pivotable about a longitudinally extending horizontal axis at a lower end of the saw 98. The saw box 96 is located adjacent the forward edge of the rectangular support frame of the cutter head assembly to position the saw 98 for engaging and removing the small-diameter top portion of a tree which has been drawn through and is still engaged in the cutting opening of the cutter head assembly.

In order to prevent limbs from pressing against and interfering with the saw box 96 and the pivotal movement of the saw 98, a forwardly extending cutting blade 106 is affixed to the front guard plate 102 of the saw box housing 100 adjacent an inner edge of the guard plate 102, the cutting blade 106 extending along a substantial portion of the vertical inner edge of the guard plate 102. As a tree is drawn through the cutter head assembly, any limbs which are drawn over the cutting blade 106 are cut off at that point so that the portions of the limbs which extended outwardly beyond the cutting blade location are removed to prevent their interfering with the saw box.

In the drawings and specification there has been set forth a particular and preferred embodiment of the invention, and this embodiment has been described in considerable detail and with the aid of specific terms. However, such specific terms are used in an illustrative and descriptive sense only, and the terms employed and the form and arrangement of features of the illustrated and described embodiment are not to be regarded as limiting the scope of the invention defined in the claims.

What is claimed is:

1. A cutter head assembly for delimbing trees, comprising:
a generally rectangular support frame; and
first and second pairs of curved limb-stripping levers supported by the support frame, each of the limb-stripping levers including a curved cutting blade fixed thereto, the limb-stripping levers of each said pair being generally opposed to one another and generally equally spaced about a longitudinal axis of the cutter head assembly and pivotally supported for movement toward and away from each other, the limb-stripping levers and cutting blades of said first pair being configured and positioned to engage opposite side and lower portions of a tree bole of a predetermined maximum diameter being pulled through the cutter head assembly generally along the longitudinal axis, and the limb-stripping levers and cutting blades of said second pair being configured and positioned to engage opposite side and upper portions of a tree bole of said predetermined maximum diameter being pulled through the cutter head assembly generally along the longitudinal axis;

said first pair o limb-stripping levers being synchronously movable with each other for centering a tree bole in the cutter head assembly; and said second pair of limb-stripping levers being independently movable with respect to each other for accommodating crooked tree boles.

2. The cutter head assembly of claim 1 wherein the limb-stripping levers of said first pair are supported so as to be pivotable about horizontally spaced first axes which are parallel to the longitudinal axis of the cutter head assembly, and the limb-stripping levers of said second pair are supported so as to be pivotable about horizontally spaced second axes which are parallel to the longitudinal axis, the second axes being spaced horizontally outward of and vertically above the first axes so as to position the limb-stripping levers of said second pair for engaging upper portions of a tree bole being pulled through the cutter head assembly.

3. The cutter head assembly of claim 1 wherein the cutting blades extend generally longitudinally forward from the limb-stripping levers, and wherein each limb-stripping lever further comprises a deflecting member connected to the cutting blade and angled outwardly therefrom for deflecting cut pieces of a tree outwardly away from the cutting blade.

4. The cutter head assembly of claim 3 wherein each limb-stripping lever includes a transversely extending portion and each cutting blade is connected to the transversely extending portion of the respective limb-stripping lever to define a generally perpendicular juncture therewith, and wherein the deflecting members comprise curved bevel plates connected between the cutting blades and the transversely extending portions of the limb-stripping levers adjacent the junctures, the bevel plates being angled outwardly with respect to the respective cutting blades.

5. The cutter head assembly of claim 1 wherein the limb-stripping levers of said first pair are supported adjacent a front end of the support frame, and said second pair of limb-stripping levers are longitudinally spaced downstream of said first pair of limb-stripping levers.

6. The cutter head assembly of claim 1, further comprising actuators connected to the limb-stripping levers for positively moving the limb-stripping levers outwardly to open positions in preparation for receiving a tree bole in the cutter head assembly and for positively moving the limb-stripping levers inwardly to positions engaging a tree bole.

7. The cutter head assembly of claim 6 wherein the actuators comprise hydraulic cylinders operatively connected to the limb-stripping levers for imparting positive inward and outward movement to the limb-stripping levers.

8. The cutter head assembly of claim 1, further comprising a positive drive interconnecting the limb-stripping levers of said first pair, the positive drive operating to insure simultaneous and synchronous inward and outward movement of the limb-stripping levers of said first pair.

9. The cutter head assembly of claim 8 wherein the limb-stripping levers of said first pair are mounted on a pair of rotatable drive tubes spaced about and parallel to the longitudinal axis of the cutter head assembly, and wherein the positive drive comprises a gear train connected between the drive tubes, the gear train including a first timing gear secured to one of the drive tubes for rotation therewith and a second timing gear secured to the other of the drive tubes for rotation therewith.

10. The cutter head assembly of claim 1, further comprising a saw box supported adjacent a front end of the support frame, the saw box including a housing having a front edge and a saw disposed in the housing, the saw being pivotally movable with respect to the support frame to engage a tree being pulled through the cutter head assembly for removing a top portion of the tree, the saw box further including a fixed cutting blade secured adjacent the front edge of the housing for removing tree limbs which would otherwise press against and interfere with the saw box.

11. The cutter head assembly of claim 10 wherein the saw box housing includes a vertically oriented guard plate located forward of the curved limb-stripping levers, and the fixed cutting blade is affixed at an inner edge of the guard plate.

12. The cutter head assembly of claim 1, further comprising a stationary cutting blade secured to the support frame generally adjacent a front end thereof and positioned to engage a bottom portion of a tree bole being pulled through the cutter head assembly for removing limbs from the bottom of the tree.

13. A method of delimbing a tree, comprising:

providing a cutter head assembly having first and second pairs of curved limb-stripping levers, the limb-stripping levers of each said pair being generally opposed to one another and generally equally spaced about a longitudinal axis of the cutter head assembly and pivotally supported for movement toward and away from each other, the limb-stripping levers of said first pair being configured and positioned to engage opposite side and lower portions of a tree bole and the limb-stripping levers of said second pair being configured and positioned to engage opposite side and upper portions of a tree bole;

pivotally moving the levers of each said pair away from each other in preparation for receiving the tree;

positioning a butt end of the tree between the first and second pairs of limb-stripping levers with a longitudinal axis of the tree oriented generally along the longitudinal axis of the cutter head assembly;

synchronously pivoting the levers of said first pair toward each other to engage and at least partially encircle the trunk of the tree and to center the trunk between the levers of said first pair;

pivoting the levers of said second pair toward each other and independently with respect to each other so as to engage and at least partially encircle the trunk;

drawing the tree longitudinally through the cutter head assembly so that the limb-stripping levers remove the limbs from the tree; and allowing the second pair of levers to pivot independently with respect to each other as the tree is drawn through the cutter head assembly so as to remain engaged with the tree trunk and strip limbs therefrom even if the tree trunk is crooked.

14. The method of claim 13 wherein the step of pivotally moving the levers comprises first pivotally moving the levers of said first pair toward each other to engage and at least partially encircle the tree trunk while the levers of said second pair remain disengaged from the trunk, and further comprising the step of allowing the cutter head assembly to freely pivot about vertical and transverse horizontal axes as the levers of said first pair engage and encircle the trunk so that the cutter head assembly becomes aligned with the longitudinal axis of the trunk, the levers of said second pair being pivotally moved toward each other to engage and at least partially encircle the trunk after the cutter head assembly has become aligned with the trunk.

\* \* \* \* \*